(12) United States Patent
Watanabe et al.

(10) Patent No.: US 10,845,524 B2
(45) Date of Patent: Nov. 24, 2020

(54) LIGHT GUIDE PLATE, PLANAR LIGHT SOURCE APPARATUS, DISPLAY APPARATUS, AND ELECTRONIC DEVICE

(71) Applicant: NICHIA CORPORATION, Anan (JP)

(72) Inventors: Shotaro Watanabe, Tsurugashima (JP); Kazuhide Hirota, Tsurugashima (JP); Naoki Ishimi, Tokyo (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 16/339,729

(22) PCT Filed: Dec. 5, 2017

(86) PCT No.: PCT/JP2017/043610
§ 371 (c)(1),
(2) Date: Apr. 5, 2019

(87) PCT Pub. No.: WO2018/105597
PCT Pub. Date: Jun. 14, 2018

(65) Prior Publication Data
US 2020/0049876 A1  Feb. 13, 2020

(30) Foreign Application Priority Data
Dec. 9, 2016  (JP) .................... 2016-239560

(51) Int. Cl.
*G09F 13/04*   (2006.01)
*G09F 13/08*   (2006.01)
(Continued)

(52) U.S. Cl.
CPC ......... *G02B 6/0016* (2013.01); *G02B 6/0028* (2013.01); *G02F 1/0107* (2013.01); *G02F 1/133603* (2013.01)

(58) Field of Classification Search
CPC .. F21S 2/00; G02B 6/00–0063; G02F 1/0107; G02F 1/1335–133504; G02F 1/133602–133611
(Continued)

(56) References Cited

U.S. PATENT DOCUMENTS 8,248,556 B2 *  8/2012  Larson ................. G02B 6/0018
                                                    349/62
8,506,148 B2 *  8/2013  Shimizu .............. G02B 6/0016
                                                    362/606
(Continued)

FOREIGN PATENT DOCUMENTS

CN        102216672 A     10/2011
CN        102313165 A      1/2012
(Continued)

OTHER PUBLICATIONS

An English translation of the International Search Report ("ISR") of PCT/JP2017/043610 dated Feb. 27, 2018.
(Continued)

*Primary Examiner* — Jason M Han
(74) *Attorney, Agent, or Firm* — Metrolex IP Law Group, PLLC

(57) ABSTRACT

An object is to promote a reduction in thickness of a light guide plate and suppress brightness non-uniformity of the light guide plate. A light guide plate, including: a light exit surface from which light is emitted; an opposite surface on an opposite side of the light exit surface; a depressed portion provided on the opposite surface; and a plurality of scattering portions which are provided on the light exit surface, the opposite surface, and a bottom surface of the depressed portion and which refract and scatter light, wherein the depressed portion has a tapered surface which spreads from
(Continued)

the bottom surface of the depressed portion toward an opening of the depressed portion.

15 Claims, 14 Drawing Sheets

(51) Int. Cl.
  *F21V 8/00* (2006.01)
  *G02F 1/01* (2006.01)
  *G02F 1/13357* (2006.01)
(58) Field of Classification Search
  USPC .................................................. 362/97.1–97.4
  See application file for complete search history.

(56) References Cited

U.S. PATENT DOCUMENTS

| | | |
|---|---|---|
| 2011/0194034 A1 | 8/2011 | Shimizu |
| 2012/0008308 A1 | 1/2012 | Adachi et al. |
| 2012/0069575 A1 | 3/2012 | Koh et al. |
| 2012/0069579 A1 | 3/2012 | Koh et al. |
| 2013/0250617 A1 | 9/2013 | Ahn et al. |

FOREIGN PATENT DOCUMENTS

| | | |
|---|---|---|
| JP | 3427636 B2 | 7/2003 |
| JP | 2006-134811 A | 5/2006 |
| JP | 2012-004038 A | 1/2012 |
| KR | 10-2012-0051945 A | 5/2012 |
| TW | I444679 B | 7/2014 |

OTHER PUBLICATIONS

An English translation of the International Searching Authority ("ISA") Written Opinion ("WO") of PCT/JP2017/043610 dated Feb. 27, 2018.
The Chinese Office Action dated Feb. 3, 2020 in a counterpart Chinese patent application.
The Notice of Preliminary Rejection dated May 20, 2020 in a counterpart Korean application.

\* cited by examiner

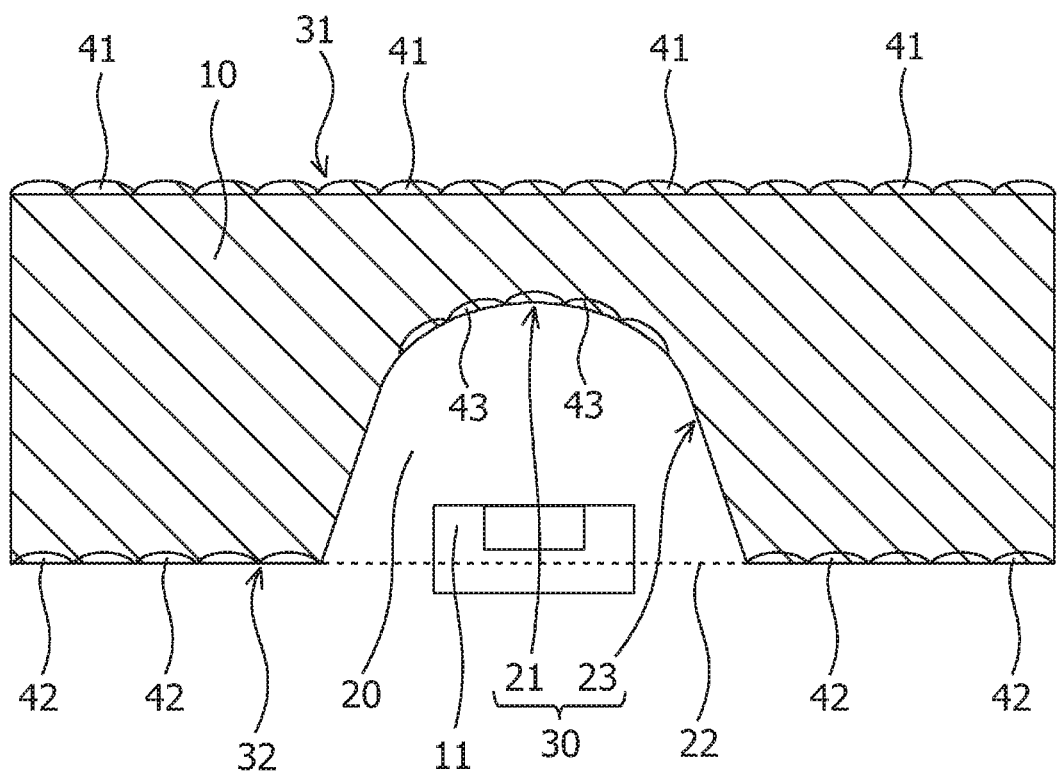

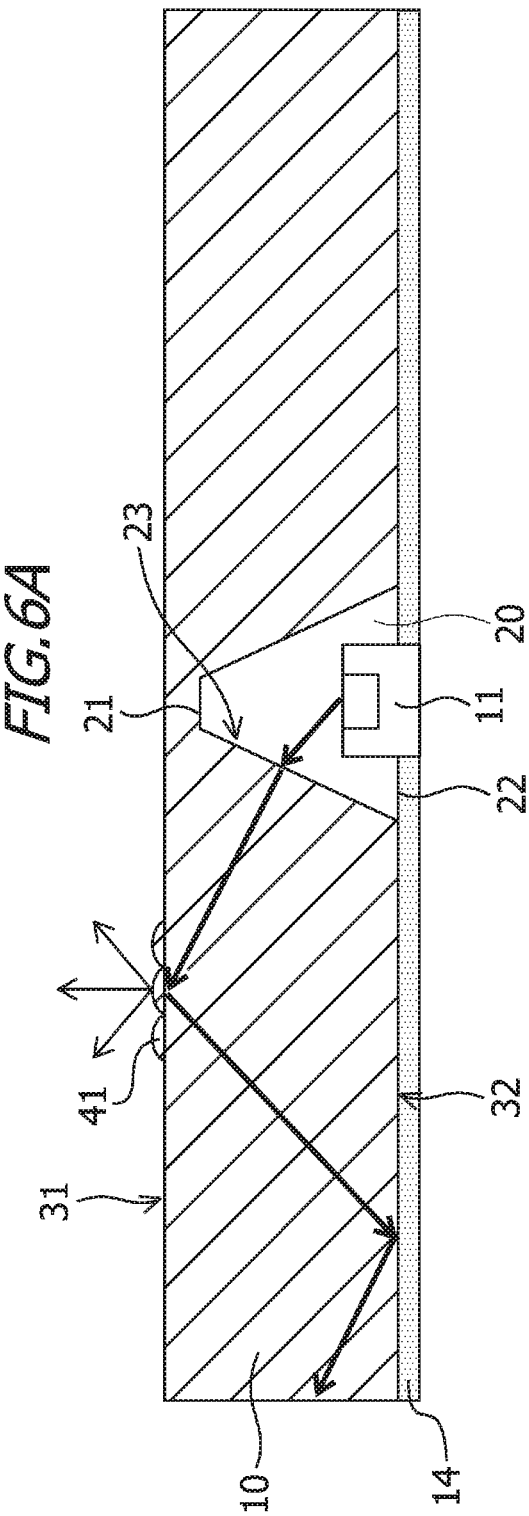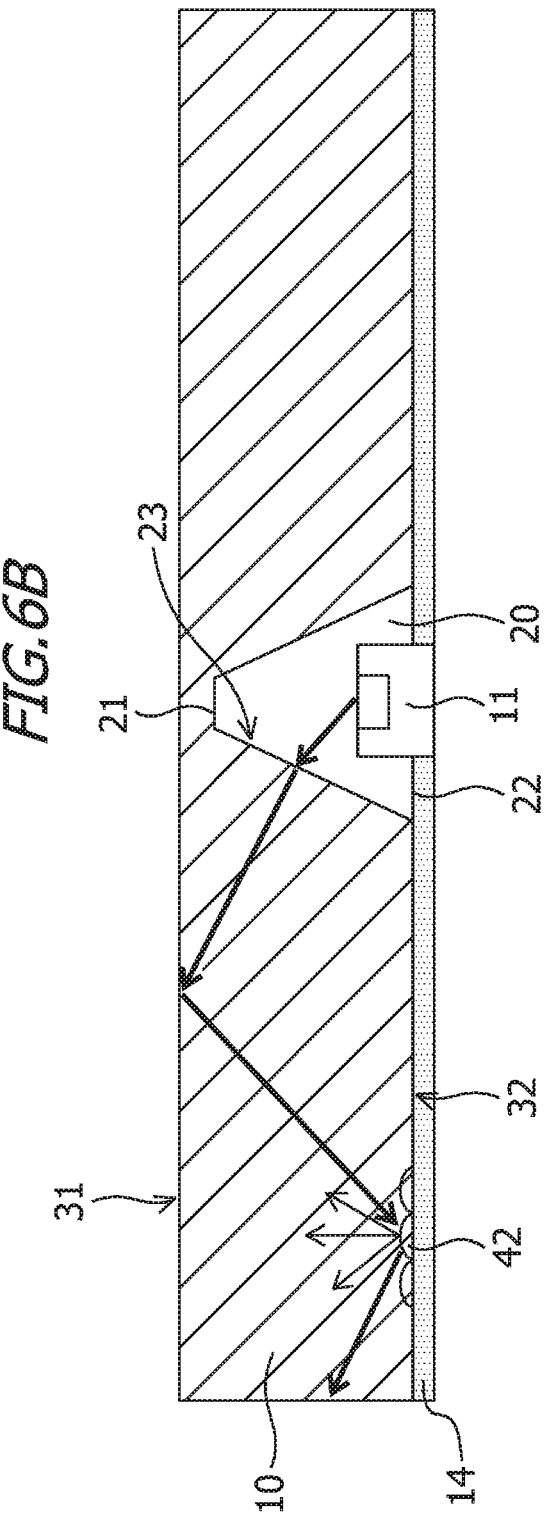

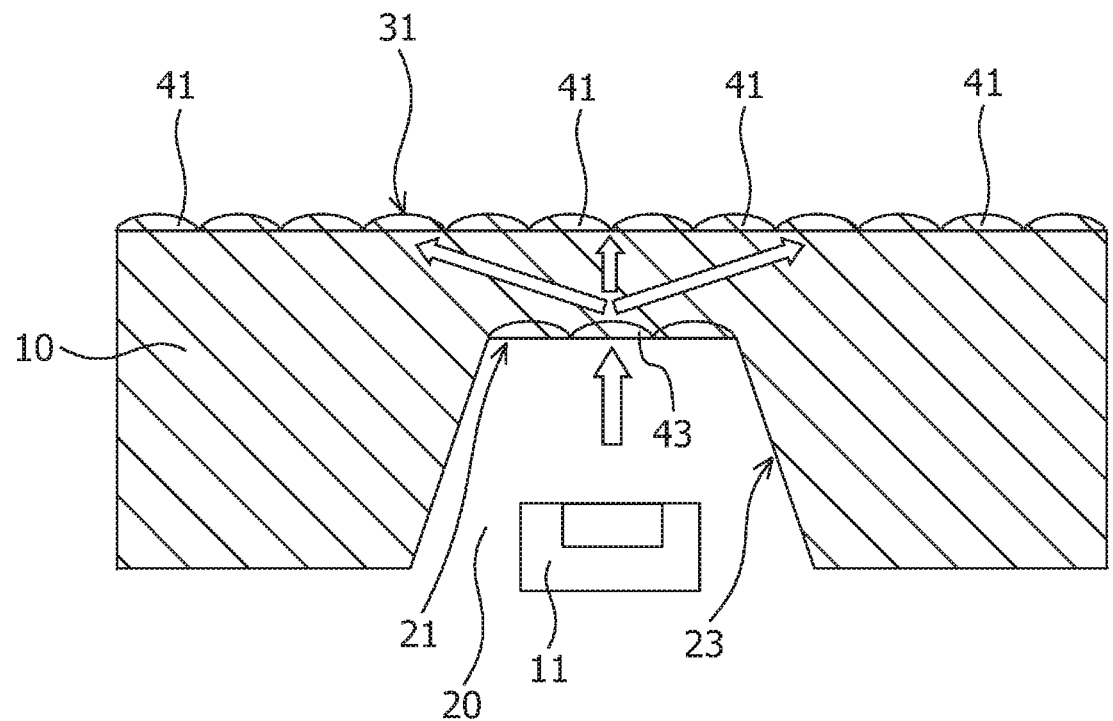

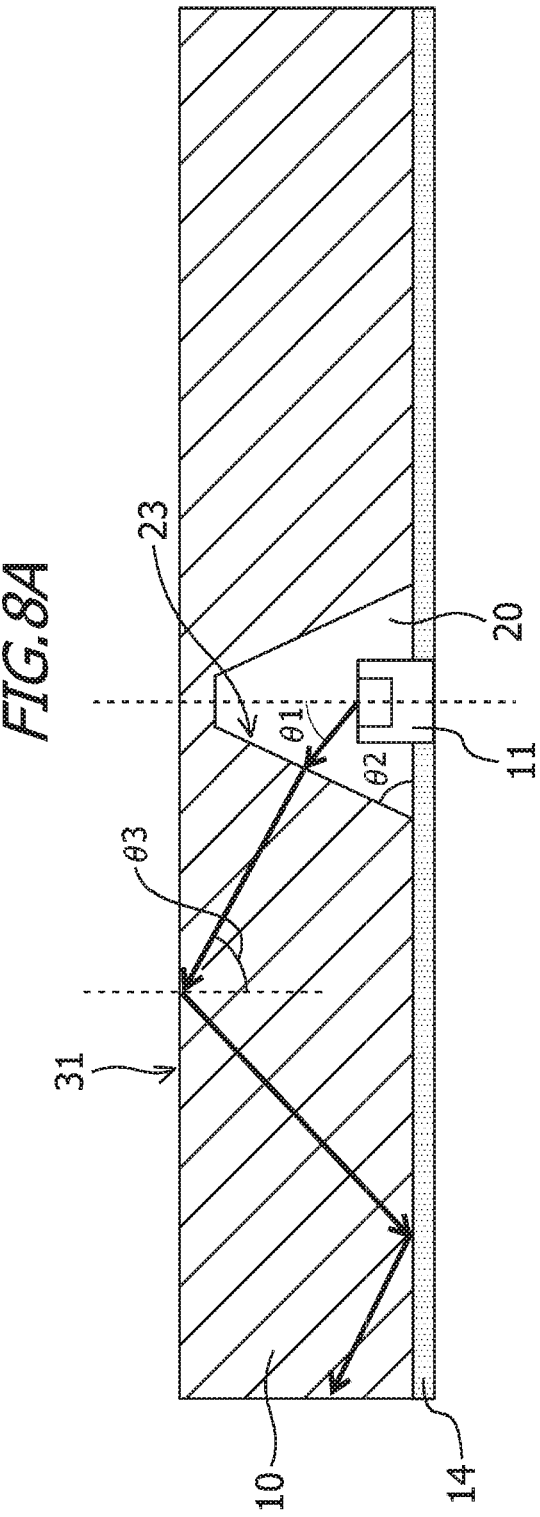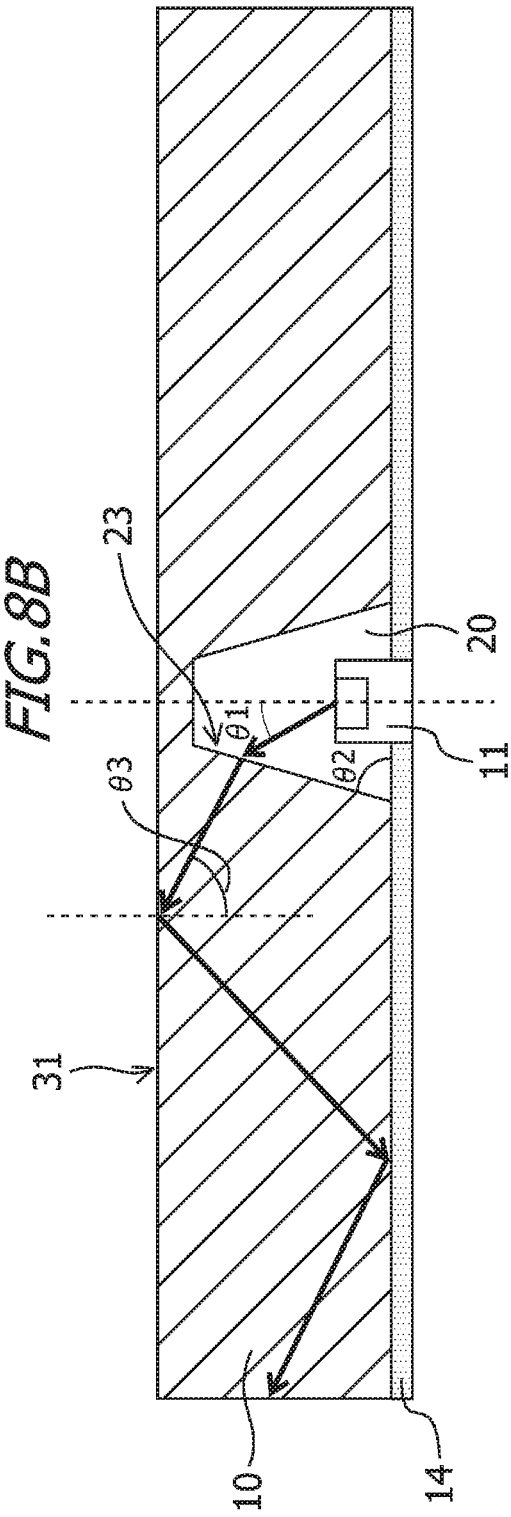

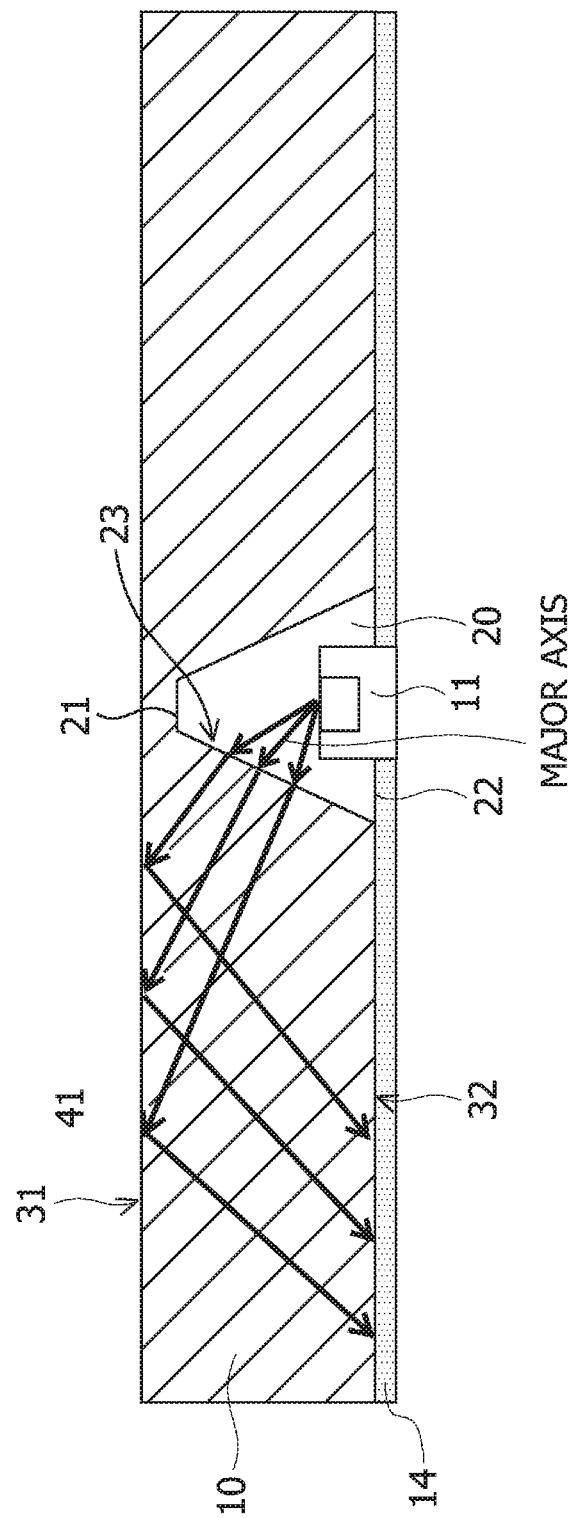

LIGHT GUIDE PLATE, PLANAR LIGHT SOURCE APPARATUS, DISPLAY APPARATUS, AND ELECTRONIC DEVICE

TECHNICAL FIELD

The present invention relates to a light guide plate, a planar light source apparatus, a display apparatus, and an electronic device.

BACKGROUND ART

In recent years, advances have been made in reducing sizes and thicknesses of electronic devices. There are demands for a reduction in a thickness of a light guide plate of a liquid crystal display apparatus (a liquid crystal display) to be mounted to such electronic devices. Backlight systems for liquid crystal display apparatuses include a system referred to as an edge light-type backlight and a system referred to as a direct-type backlight. Direct-type backlights which feature high light utilization efficiency and which enable higher brightness to be readily achieved are used as backlights for large-size liquid crystal display apparatuses. For example, an LED (Light Emitting Diode) which emits white light is used as a light source of a backlight. In the case of a direct-type backlight, while a plurality of LEDs are arranged directly underneath a light guide plate, brightness non-uniformity easily occurs on the light guide plate between portions directly above the LEDs and other portions. Regarding the technique described above, a planar light source apparatus has been proposed in which, for the purpose of reducing variations in brightness of a light source, the light source is installed in a conical depression for light source insertion provided on a rear surface of a light guide plate and light-scattering dots for scattering light inside the light guide plate are provided on the rear surface of the light guide plate (refer to Patent document 1).

CITATION LIST

Patent Document

[Patent document 1] Japanese Patent No. 3427636

SUMMARY OF INVENTION

Technical Problem

There are demands for a reduction in sizes of light guide plates and suppression of brightness non-uniformity in light guide plates. In consideration of such circumstances, an object of the present invention is to promote a reduction in thickness of a light guide plate and to provide a technique for suppressing brightness non-uniformity in the light guide plate.

Means for Solving the Problems

In the present invention, the following means is adopted in order to solve the problem described above. Specifically, the present invention is a light guide plate including: a light exit surface from which light is emitted; an opposite surface on an opposite side of the light exit surface; a depressed portion provided on the opposite surface; and a plurality of scattering portions which are provided on the light exit surface, the opposite surface, and a bottom surface of the depressed portion and which refract and scatter light, wherein the depressed portion has a tapered surface which spreads from the bottom surface of the depressed portion toward an opening of the depressed portion.

According to the present invention, due to light striking the tapered surface and being refracted and made incident into the light guide plate, the light incident into the light guide plate widely spreads. According to the present invention, light strikes the scattering portion provided on the bottom surface of the depressed portion, and the light is refracted, scattered, and made incident into the light guide plate. According to the present invention, the light inside the light guide plate strikes the scattering portion provided on the opposite surface, and the light inside the light guide plate is refracted and scattered. According to the present invention, the light inside the light guide plate strikes the scattering portion provided on the light exit surface, the light inside the light guide plate is refracted, scattered, and emitted from the light exit surface of the light guide plate to the outside. According to these configurations, a brightness distribution of the light exit surface of the light guide plate can be made uniform and brightness non-uniformity of the light guide plate can be suppressed without increasing a thickness of the light guide plate.

In the light guide plate according to the present invention, a plurality of scattering portions provided on the light exit surface, the opposite surface, and the bottom surface of the depressed portion are respectively densely arranged. According to this configuration, since the likelihood that the light inside the light guide plate and light emitted from the light exit surface of the light guide plate are refracted and scattered increases, the brightness distribution of the light exit surface of the light guide plate can be made more uniform and brightness non-uniformity of the light guide plate can be further suppressed without increasing the thickness of the light guide plate.

In the light guide plate according to the present invention, the depressed portion has a truncated cone shape. According to this configuration, since a light source with a small size can be housed inside the depressed portion, the brightness distribution of the light exit surface of the light guide plate can be made uniform and the brightness non-uniformity of the light guide plate can be suppressed without increasing the thickness of the light guide plate.

In the light guide plate according to the present invention, an angle of the tapered surface is set in accordance with an angle of a major axis of the light source housed inside the depressed portion. According to this configuration, even when the major axis of the light source is changed by changing a type of the light source, an angle of incidence of light incident into the light exit surface of the light guide plate can be maintained at a constant angle. In addition, a peak direction of emitted light of the light source can be controlled. Therefore, a brightness distribution of the light exit surface of the light guide plate can be controlled for each light source.

In the light guide plate according to the present invention, the depressed portion is provided in plurality on the opposite surface. According to this configuration, a light source can be housed in each of the depressed portions. A planar light source apparatus according to the present invention includes: the light guide plate according to the present invention; and a light source housed inside a depressed portion, wherein an angle of the tapered surface is set in accordance with an angle of a major axis of the light source. Since such a planar light source apparatus includes the light guide plate according to the present invention, the planar light source apparatus can be provided in which a brightness distribution of the light exit surface of the light guide plate is made uniform and the brightness non-uniformity of the light guide plate is suppressed without increasing the thickness of the light guide plate.

The planar light source apparatus according to the present invention includes: the light guide plate according to the present invention; a light source arranged on a side of the opposite surface of the light guide plate; and a transparent resin layer arranged between the light guide plate and the light source, wherein the light source is embedded in the transparent resin layer. In addition, the planar light source apparatus according to the present invention includes: the light guide plate according to the present invention; a plurality of light sources arranged on a side of the opposite surface of the light guide plate; and a transparent resin layer arranged between the light guide plate and the plurality of light sources, wherein the plurality of light sources are embedded in the transparent resin layer. According to these configurations, a distance between the light guide plate and the light source can be kept constant without increasing the thickness of the light guide plate. By separating the light guide plate and the light source from each other without housing the light source inside the depressed portion of the light guide plate, spread of light incident into the light guide plate can be increased. In addition, by housing the light source and the transparent resin layer inside the depressed portion of the light guide plate and increasing a distance between the light guide plate and the light source, spread of light incident into the light guide plate can be increased.

A display apparatus according to the present invention includes: the planar light source apparatus according to the present invention; and a display panel which receives light emitted from the planar light source apparatus. Since such a display apparatus includes the light guide plate and the planar light source apparatus according to the present invention, the display apparatus can be provided in which a brightness distribution of the light exit surface of the light guide plate is made uniform and the brightness non-uniformity of the light guide plate is suppressed without increasing the thickness of the light guide plate.

An electronic device according to the present invention includes the display apparatus according to the present invention. Since such an electronic device includes the light guide plate, the planar light source apparatus, and the display apparatus according to the present invention, the electronic device can be provided in which a brightness distribution of the light exit surface of the light guide plate is made uniform and the brightness non-uniformity of the light guide plate is suppressed without increasing the thickness of the light guide plate.

Advantageous Effects of Invention

According to the present invention, a reduction in thickness of a light guide plate can be promoted and brightness non-uniformity of the light guide plate can be suppressed.

BRIEF DESCRIPTION OF DRAWINGS

FIG. 4C is an enlarged sectional view of a light guide plate.

FIG. 6A is a sectional view of a light guide plate.

FIG. 6B is a sectional view of a light guide plate.

FIG. 7 is an enlarged sectional view of a light guide plate.

FIG. 8A is a diagram showing a relationship between an angle of a major axis of a light source and an angle of a tapered surface of a depressed portion.

FIG. 8B is a diagram showing a relationship between an angle of a major axis of a light source and an angle of a tapered surface of a depressed portion.

FIG. 9 is a diagram showing travel of light when light is emitted from a light source in a range of approximately ±20 degrees with respect to an angle of a major axis of the light source.

DESCRIPTION OF EMBODIMENTS

Hereinafter, an embodiment of the present invention will be described with reference to the drawings. It is to be understood that the embodiment described below merely represents an example of implementing the present invention and is not intended to limit the present invention to the specific configurations described hereinafter.

In the embodiment described below, the "display apparatus" will be described as a liquid crystal display apparatus and the "planar light source apparatus" will be described as a backlight of the liquid crystal display apparatus. The "planar light source apparatus" can be used for applications other than a backlight such as a front light arranged in a front surface of a display panel or an electronic paper-based display apparatus.

(Configuration of Liquid Crystal Display Apparatus)

Figure 1:
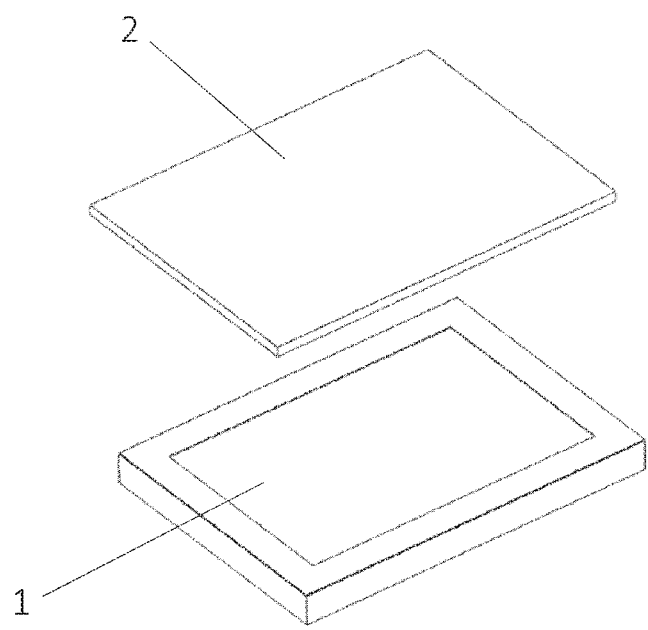
FIG. 1 is a perspective view illustrating a configuration of a liquid crystal display apparatus according to an embodiment.

FIG. 1 is a perspective view illustrating a configuration of a liquid crystal display apparatus according to the embodiment. As shown in FIG. 1, the liquid crystal display apparatus includes: a planar light source apparatus 1 arranged as a backlight; and a display panel 2 which receives light emitted from the planar light source apparatus 1. The display panel 2 displays images by applying voltage to liquid crystals encapsulated by being sandwiched between glass plates and increasing or reducing transmittance of light. Hereinafter, in the planar light source apparatus 1, a side of the display panel 2 may be described as an upper surface side and a side of an opposite surface thereto may be described as a lower surface side.

(Configuration of Planar Light Source Apparatus 1)

Figure 2:
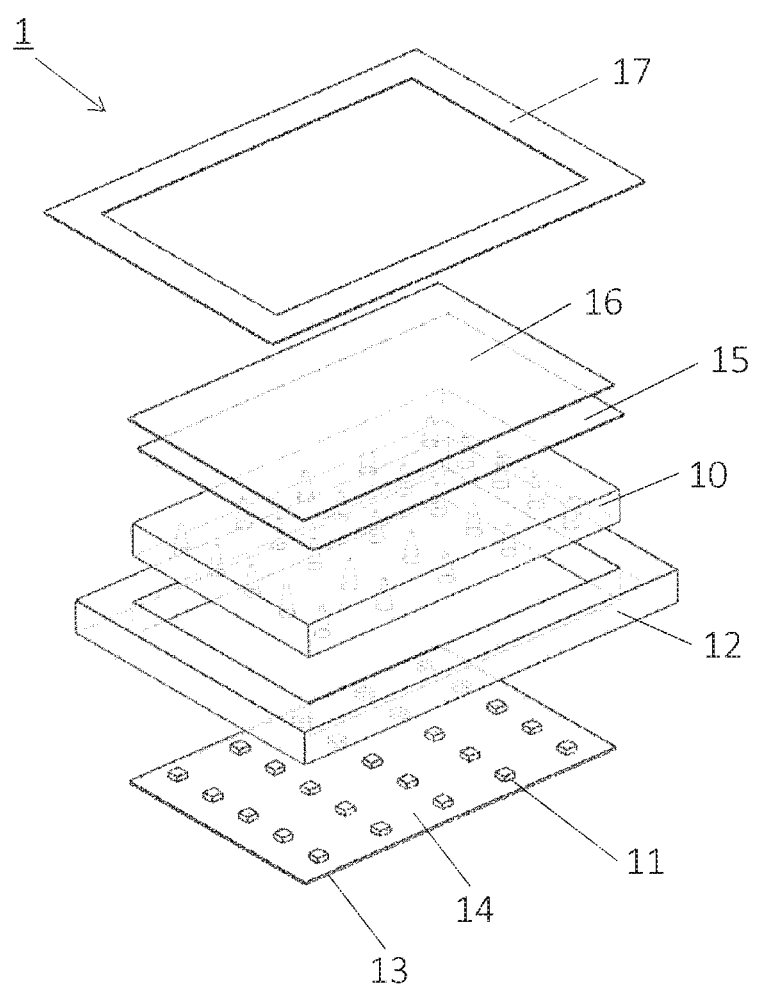
FIG. 2 is a perspective view illustrating a configuration of a planar light source apparatus according to an embodiment.

FIG. 2 is a perspective view illustrating a configuration of the planar light source apparatus 1 according to the embodiment. The planar light source apparatus 1 includes a light guide plate 10 and a frame 12. In addition, the planar light source apparatus 1 includes a plurality of light sources 11, a mounting substrate 13, and a reflective layer 14 arranged on the lower surface side of the light guide plate 10. The lower surface side of the light guide plate 10 is an opposite side of a side on which the display panel 2 is arranged. The planar light source apparatus 1 further includes a diffusing sheet 15, a prism sheet 16, and a light shielding member 17 laminated in order on the upper surface side of the light guide plate 10. The upper surface side of the light guide plate 10 is the side on which the display panel 2 is arranged. One or a plurality of prism sheets 16 may be provided.

The light guide plate 10 has an approximately flat plate shape and is molded from a translucent material such as a polycarbonate resin or a polymethyl methacrylate resin. An upper surface of the light guide plate 10 is a light exit surface from which light is emitted and which faces the display panel 2. The light guide plate 10 is configured such that light incident into the light guide plate 10 is guided to the light exit surface and the entire light exit surface is uniformly lighted.

The light source 11 emits white light from a light-emitting surface. While the light source 11 is, for example, an LED package, a light source other than an LED package may be used instead. The light source 11 is formed by encapsulating an LED chip that is a light emitting element with a translucent resin (resin layer) containing phosphor. Alternatively, instead of arranging the phosphor on the LED chip, a phosphor layer may be arranged on the light exit surface of the light guide plate 10 or a phosphor layer may be arranged on the diffusing sheet 15. The light source 11 is driven by receiving supply of power from the mounting substrate 13. An LED light source with a color other than white may be used as the light source 11. The light source 11 is arranged below the light guide plate 10.

The frame 12 is a frame-like member (an example of a "frame body") which has an opening and which is constituted by four sides. The frame 12 is molded from a polycarbonate resin containing titanium oxide, a polycarbonate resin not containing titanium oxide, or the like. The light guide plate 10 is fitted into the frame 12, and an inner circumferential surface of the frame 12 surrounds a side surface of the light guide plate 10 that forms an outer circumferential surface of the light guide plate 10. The frame 12 has high reflectance and reflects and reuses light having leaked from the side surface of the light guide plate 10. The mounting substrate 13 is a wiring substrate on which wiring is provided by a conductive foil on an insulating substrate.

The plurality of light sources 11 and the reflective layer 14 are provided on the mounting substrate 13. The reflective layer 14 is provided around the light sources 11. The reflective layer 14 is, for example, a white resin, a metal foil, or the like with high reflectance and reflects light so that light inside the light guide plate 10 does not leak from the lower surface of the planar light source apparatus 1. The diffusing sheet 15 is a semi-transparent resin film which diffuses light emitted from the light exit surface of the light guide plate 10 and which widens directional characteristics of the light. The prism sheet 16 is a transparent resin film which has a fine triangular prism-shaped pattern formed on an upper surface thereof and which collects light diffused by the diffusing sheet 15 and increases brightness when the planar light source apparatus 1 is viewed from the upper surface side.

The light shielding member 17 has a frame shape when the planar light source apparatus 1 is viewed from the upper surface side. The frame shape need only be a closed-loop shape and may be, for example, a rectangle shape, an approximately ellipsoidal shape, or another shape. For example, the light shielding member 17 may be a black adhesive tape in which both upper and lower faces are adhesive faces. A frame portion of the light shielding member 17 is bonded along an upper end of the frame 12 and prevents light from leaking out from the planar light source apparatus 1.

Figure 3:
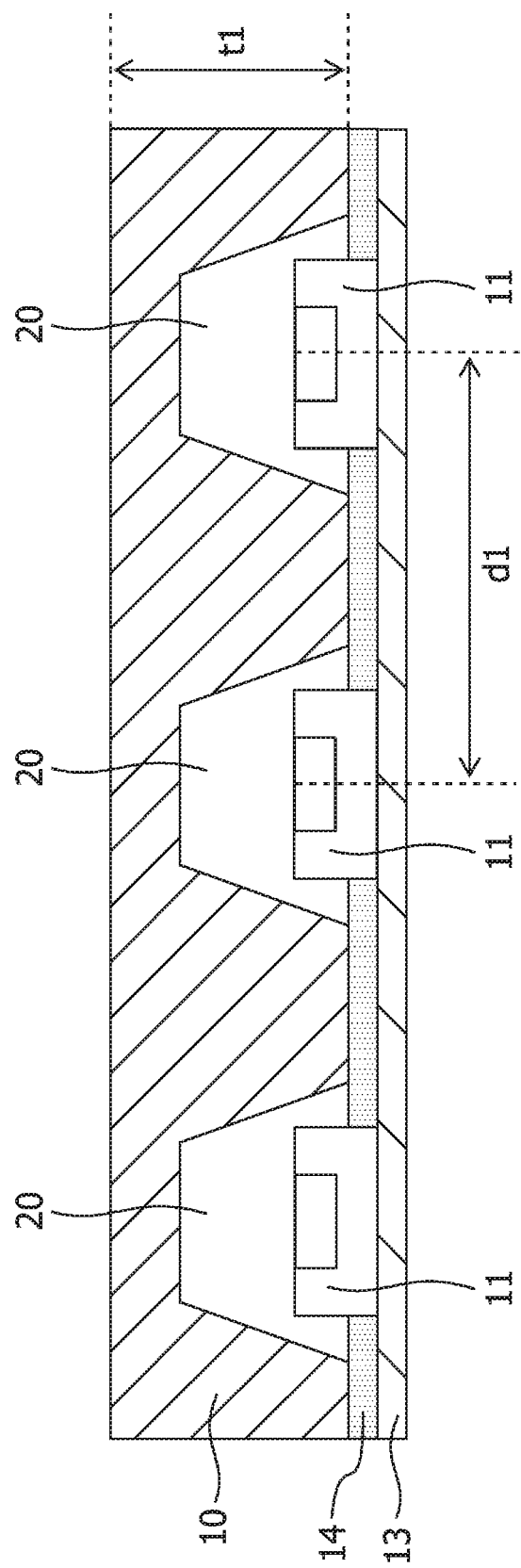
FIG. 3 is a sectional view of a light guide plate.

FIG. 3 is a sectional view of the light guide plate 10. The light guide plate 10 has a plurality of depressed portions 20 on the lower surface of the light guide plate 10. The depressed portion 20 has a truncated cone shape. The plurality of light sources 11 are arranged on the mounting substrate 13 and one light source 11 is housed inside each depressed portion 20. Since the depressed portion 20 has a truncated cone shape, the light source 11 with a small size can be housed inside the depressed portion 20. Light emitted from the light source 11 is incident into the light guide plate 10. Due to light incident into the light guide plate 10 being refracted, reflected, and diffused inside the light guide plate 10 and emitted from the light exit surface of the light guide plate 10, the light exit surface of the light guide plate 10 is uniformly lighted. While a thickness (height) t1 of the light guide plate 10 is, for example, 0.35 mm, the thickness (height) t1 is not limited to this value and may assume another value. While a pitch d1 of the light sources 11 is, for example, 2 to 4 mm, the pitch d1 is not limited to these values and may assume other values.

Figure 4A:
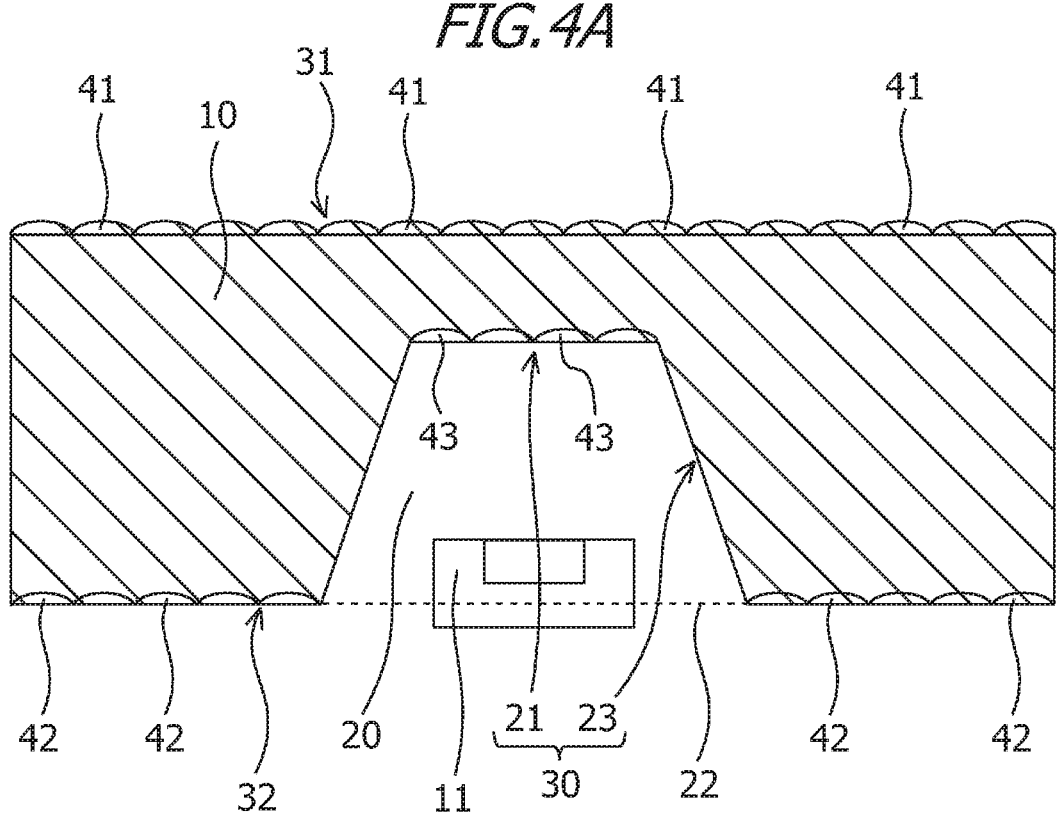
FIG. 4A is an enlarged sectional view of a light guide plate.

FIG. 4A is an enlarged sectional view of the light guide plate 10. The light guide plate 10 includes a light incident surface 30 to which light is incident, a light exit surface 31 which emits light incident from the light incident surface 30, and an opposite surface 32 on an opposite side of the light exit surface 31. The opposite surface 32 of the light guide plate 10 constitutes the lower surface of the light guide plate 10. The depressed portions 20 are provided on the opposite surface 32 of the light guide plate 10. The depressed portion 20 has a bottom surface 21, an opening 22, and a tapered surface (an inclined surface) 23 which spreads from the bottom surface 21 toward the opening 22. The tapered surface 23 is a smooth surface. The light exit surface 31 and the opposite surface 32 of the light guide plate 10 and the bottom surface 21 of the depressed portion 20 are parallel to each other. The diameter of the depressed portion 20 widens from the bottom surface 21 toward the opening 22 of the depressed portion 20. While a diameter of the bottom surface 21 of the depressed portion 20 is, for example, 40.43 mm, the diameter is not limited to this value and may assume another value. While a height (depth) of the depressed portion 20 is, for example, 0.32 mm, the diameter is not limited to this value and may assume another value. A shape, a height, and a width of the light source 11 are not particularly limited and the light source 11 need only have a shape and a size which enable the light source 11 to be housed inside the depressed portion 20. In addition, a size of the depressed portion 20 may be changed in accordance with the shape, the height, and the width of the light source 11.

Figure 4B:
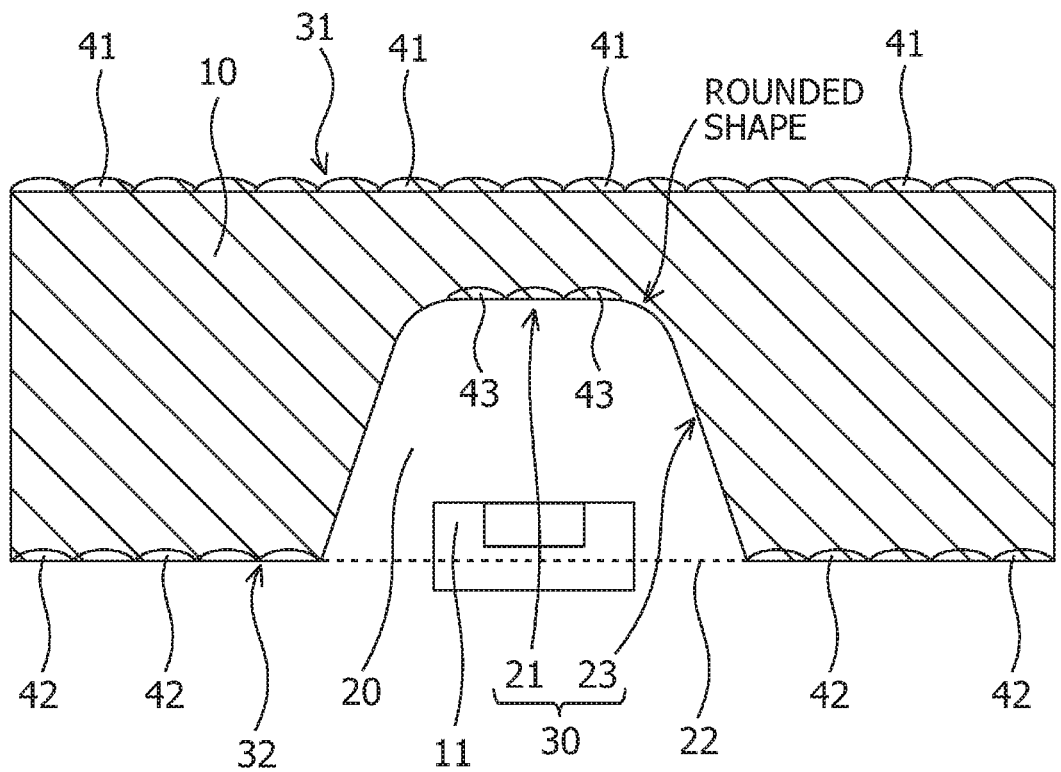
FIG. 4B is an enlarged sectional view of a light guide plate.

FIG. 4B is an enlarged sectional view of the light guide plate 10. As shown in FIG. 4B, an inside corner of the depressed portion 20 with a truncated cone shape may have a rounded shape. FIG. 4C is an enlarged sectional view of the light guide plate 10. As shown in FIG. 4C, the bottom surface 21 of the depressed portion 20 with a truncated cone shape may have a rounded shape. In other words, the bottom surface 21 of the depressed portion 20 with a truncated cone shape may be a curved surface.

Light emitted from the light source 11 strikes the tapered surface 23 of the depressed portion 20, and the light is refracted and made incident into the light guide plate 10. The light inside the light guide plate 10 is incident to the light exit surface 31 and the opposite surface 32 of the light guide plate 10. When the light incident to the light exit surface 31 of the light guide plate 10 is incident at an angle of incidence that is smaller than a critical angle, light is emitted to the outside from the light exit surface 31 of the light guide plate 10. When the light incident to the light exit surface 31 of the light guide plate 10 is incident at an angle of incidence that is larger than the critical angle, light is reflected by the light exit surface 31 of the light guide plate 10. When the light incident to the opposite surface 32 of the light guide plate 10 is incident at an angle of incidence that is smaller than the critical angle, light is emitted to the outside from the opposite surface 32 of the light guide plate 10. The light emitted from the opposite surface 32 of the light guide plate 10 is reflected by the reflective layer 14 and once again made incident into the light guide plate 10. When the light incident to the opposite surface 32 of the light guide plate 10 is incident at an angle of incidence that is larger than the critical angle, light is reflected by the opposite surface 32 of the light guide plate 10.

A plurality of dot patterns 41 are provided on the light exit surface 31 of the light guide plate 10. A plurality of dot patterns 42 are provided on the opposite surface 32 of the light guide plate 10. The light inside the light guide plate 10 strikes, and is refracted and scattered by, the dot patterns 41 provided on the light exit surface 31 of the light guide plate 10 and the dot patterns 42 provided on the opposite surface 32 of the light guide plate 10. A plurality of dot patterns 43 are provided on the bottom surface 21 of the depressed portion 20. Light emitted from the light source 11 strikes the dot patterns 43 provided on the bottom surface 21 of the depressed portion 20, and the light is refracted, scattered, and made incident into the light guide plate 10. The dot patterns 41 to 43 are examples of a scattering portion.

While the dot patterns 41 shown in FIG. 4 have a projection shape (convex shape) that projects toward the outside of the light guide plate 10, the dot patterns 41 are not limited to this shape and may have a concave shape that is depressed toward the inside of the light guide plate 10. While the dot patterns 42 and 43 shown in FIG. 4 have a concave shape that is depressed toward the inside of the light guide plate 10, the dot patterns 42 and 43 are not limited to this shape and may have a projection shape (convex shape) that projects toward the outside of the light guide plate 10. Examples of the projection shape include a convex lens shape, a columnar shape, a prismatic shape, a conical shape, and a pyramid shape. Examples of the concave shape include a concave lens shape, a columnar groove shape, a prismatic groove shape, a conical groove shape, and a pyramid groove shape. The dot patterns 41 to 43 may be any of a circle, an ellipse, and a polygon in a plan view. The dot patterns 41 to 43 may be integrally formed on the light guide plate 10 manufactured by injection molding. Alternatively, the dot patterns 41 to 43 may be separately formed on the light guide plate 10 by an ink-jet or the like. Minute irregularities may be provided on surfaces of the dot patterns 41 to 43. Forming minute irregularities on the surfaces of the dot patterns 41 to 43 enables light striking the dot patterns 41 to 43 to be further refracted and scattered.

Figure 5A:
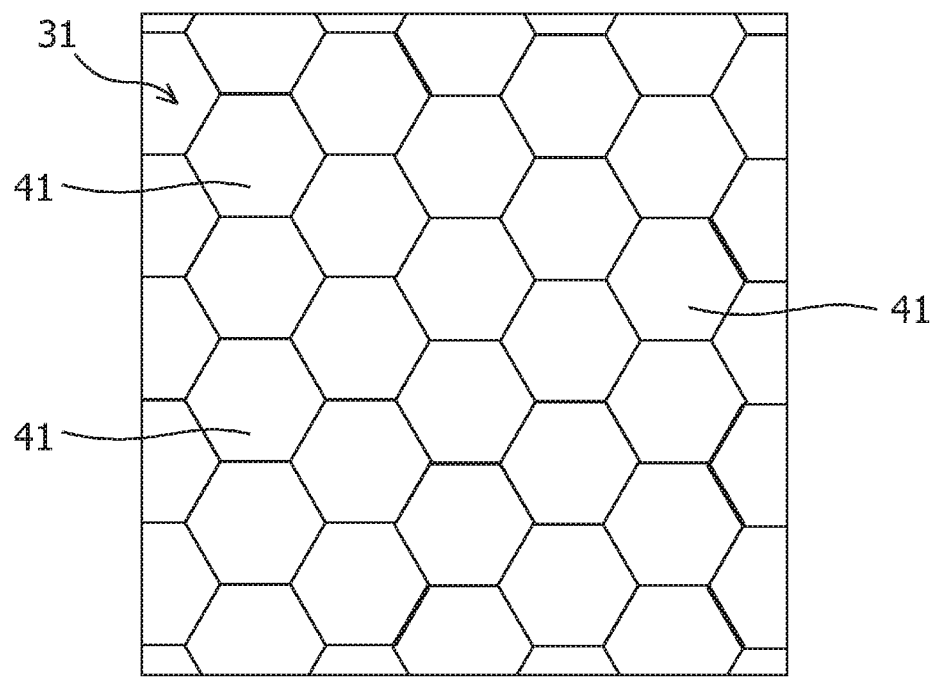
FIG. 5A is a plan view of a light guide plate.
Figure 5B:
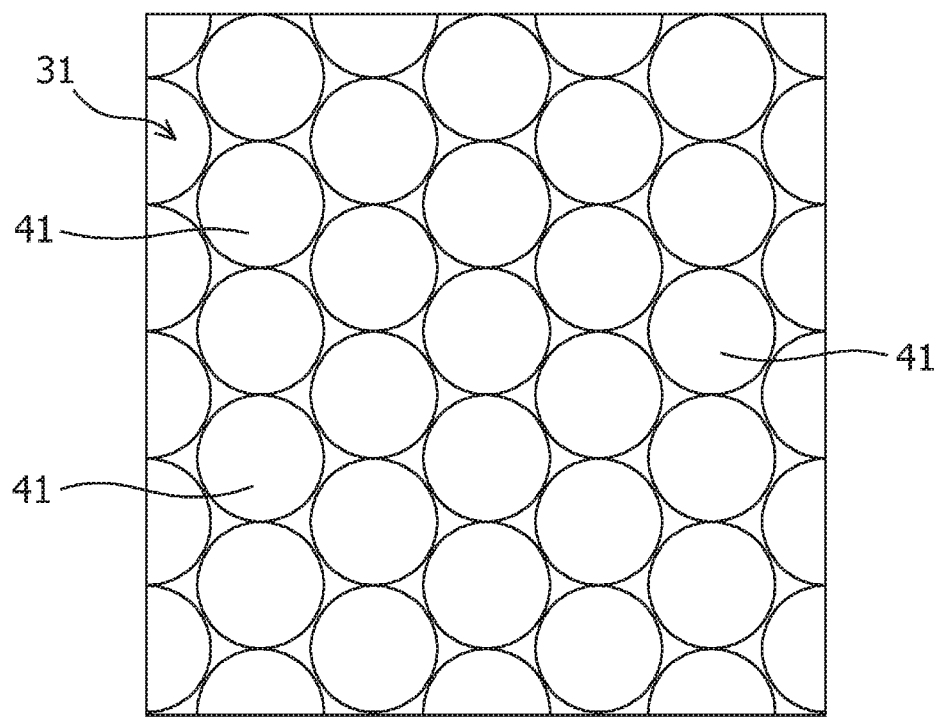
FIG. 5B is a plan view of a light guide plate.

The plurality of dot patterns 41 to 43 are respectively densely arranged. While the plurality of dot patterns 41 to 43 may be discretely arranged, in order to enhance effects of refraction and scattering of light inside the light guide plate 10 and light emitted from the light exit surface 31 of the light guide plate 10, the plurality of dot patterns 41 to 43 are preferably densely arranged. For example, as shown in FIG. 5A, the plurality of dot patterns 41 may be arranged in a closest-packed arrangement. FIG. 5A is a plan view of the light guide plate 10 as viewed from a normal direction of the light exit surface 31 of the light guide plate 10. The dot patterns 41 shown in FIG. 5A have a hexagonal shape in a plan view and the plurality of dot pattern 41 are arranged adjacent to each other. Alternatively, for example, the plurality of dot patterns 41 may be arranged as shown in FIG. 5B. FIG. 5B is a plan view of the light guide plate 10 as viewed from the normal direction of the light exit surface 31 of the light guide plate 10. The dot patterns 41 shown in FIG. 5B have a circular shape in a plan view and the plurality of dot pattern 41 are arranged adjacent to each other. While a width of the dot patterns 41 to 43 is, for example, 30 μm and a height of the dot patterns 41 to 43 is, for example, 5 to 6 μm, the width and the height of the dot patterns 41 to 43 are not limited to these values and may assume other values.

The dot patterns 41 to 43 may have the same size (height and width) or may respectively have different sizes. The dot patterns 41 and the dot patterns 42 may have the same size and the dot patterns 41 and 42 and the dot patterns 43 may have different sizes.

The dot patterns 41 and the dot patterns 43 may have the same size and the dot patterns 41 and 43 and the dot patterns 42 may have different sizes. The dot patterns 42 and the dot patterns 43 may have the same size and the dot patterns 41 and the dot patterns 42 and 43 may have different sizes. The sizes of the dot patterns 41 to 43 may be changed in accordance with a value of the thickness of the light guide plate 10 and a value of the pitch between adjacent light sources 11.

FIGS. 6A and 6B are sectional views of the light guide plate 10. As shown in FIG. 6A, since the tapered surface 23 of the depressed portion 20 spreads from the bottom surface 21 toward the opening 22, light emitted from the light source 11 in a direction other than a vertical direction of the light source 11 strikes the tapered surface 23 of the depressed portion 20. Light striking the tapered surface 23 of the depressed portion 20 and made incident into the light guide plate 10 is refracted toward a planar direction of the light guide plate 10. Therefore, a spread of light incident into the light guide plate 10 is wider than a spread of emitted light of the light source 11. As a result, light is emitted from the light exit surface 31 of the light guide plate 10 to the outside while light incident into the light guide plate 10 spreads wide with respect to the light exit surface 31 of the light guide plate 10. Accordingly, a brightness distribution of the light exit surface 31 of the light guide plate 10 can be made uniform and brightness non-uniformity of the light guide plate 10 and brightness non-uniformity of the liquid crystal display apparatus can be suppressed.

As shown in FIG. 6A, the light inside the light guide plate 10 strikes the dot patterns 41 provided on the light exit surface 31 of the light guide plate 10 and is refracted and scattered and, at the same time, light is emitted to the outside from the light exit surface 31 of the light guide plate 10. Accordingly, a brightness distribution of the light exit surface 31 of the light guide plate 10 is made uniform. In addition, as shown in FIG. 6A, light inside the light guide plate 10 travels inside the light guide plate 10 while being repetitively reflected by the light exit surface 31 and the opposite surface 32 of the light guide plate 10.

As shown in FIG. 6B, the light inside the light guide plate 10 strikes the dot patterns 42 provided on the opposite surface 32 of the light guide plate 10 and is refracted and scattered. Due to the light inside the light guide plate 10 being refracted, scattered, and emitted to the outside from the light exit surface 31 of the light guide plate 10, the brightness distribution of the light exit surface 31 of the light guide plate 10 can be made uniform and the brightness non-uniformity of the light guide plate 10 and the brightness non-uniformity of the liquid crystal display apparatus can be suppressed.

FIG. 7 is an enlarged sectional view of the light guide plate 10. As shown in FIG. 7, light emitted from the light source 11 in the vertical direction of the light source 11 strikes the dot patterns 43 provided on the bottom surface 21 of the depressed portion 20, the light is refracted, scattered, and made incident into the light guide plate 10, and light is emitted to the outside from the light exit surface 31 of the light guide plate 10. As a result, a brightness distribution of a portion directly above the light source 11 among the light exit surface 31 of the light guide plate 10 is made uniform and the brightness non-uniformity of the light guide plate 10 and the brightness non-uniformity of the liquid crystal display apparatus can be suppressed.

An angle (an angle of inclination) of the tapered surface 23 of the depressed portion 20 may be set in accordance with a light distribution angle of the light source 11 or an angle (an angle of inclination) of a major axis (a peak of emitted light) of the light source 11. FIGS. 8A and 8B are diagrams showing a relationship between the angle of the major axis of the light source 11 and the angle of the tapered surface 23 of the depressed portion 20. In FIGS. 8A and 8B, an example of a trajectory of light emitted from the light source 11 is indicated by a bold arrow. In FIG. 8A, an angle (θ1) of the major axis of the light source 11 with respect to a central line of the light source 11 is 50 degrees and an angle (θ2) of the tapered surface 23 of the depressed portion 20 with respect to the central line of the light source 11 is 60 degrees. In FIG. 8B, the angle (θ1) of the major axis of the light source 11 with respect to the central line of the light source 11 is 30 degrees and the angle (θ2) of the tapered surface 23 of the depressed portion 20 with respect to the central line of the light source 11 is 75 degrees.

The angle of the tapered surface 23 of the depressed portion 20 is set in accordance with the angle of the major axis of the light source 11 or the light distribution angle of the light source 11. Accordingly, even when the major axis or the light distribution angle of the light source 11 is changed by changing a type of the light source 11, an angle of incidence (θ3) of light incident to the light exit surface 31 of the light guide plate 10 can be maintained at a constant angle. In addition, by adjusting the angle of the tapered surface 23 of the depressed portion 20, a peak direction of emitted light (a direction in which intensity of emitted light is maximized) of the light source 11 can be controlled. Therefore, a brightness distribution of the light exit surface 31 of the light guide plate 10 can be controlled for each type of the light source 11. Furthermore, a brightness distribution of the entire light exit surface 31 of the light guide plate 10 in a case where a plurality of light sources 11 are arranged directly underneath the light guide plate 10 can be controlled.

FIG. 9 is a diagram showing travel of light when light is emitted from the light source 11 in a range of approximately ±20 degrees with respect to the angle of the major axis of the light source 11. As shown in FIG. 9, even with light in a range of approximately ±20 degrees with respect to the angle of the major axis of the light source 11, light emitted from the light source 11 travels inside the light guide plate 10 in a similar manner to the travel of light shown in FIGS. 6A and 6B.

Increasing density of light sources arranged directly underneath the light guide plate by reducing the pitch of adjacent light sources results in suppressing the brightness non-uniformity of the light guide plate. On the other hand, when the pitch of adjacent light sources is large, the brightness non-uniformity of the light guide plate cannot be suppressed unless the thickness of the light guide plate is increased. According to the embodiment, by housing the light source 11 inside the depressed portion 20 of the light guide plate 10 and causing emitted light of the light source 11 to be refracted by the tapered surface 23 of the depressed portion 20 and made incident into the light guide plate 10, the spread of light inside the light guide plate 10 is increased. In addition, according to the embodiment, the light striking the dot patterns 41 to 43 provided on the light guide plate 10 is refracted and scattered. Accordingly, even when the pitch of adjacent light sources 11 is large, a brightness distribution of the light exit surface 31 of the light guide plate 10 can be made uniform and the brightness non-uniformity of the light guide plate 10 and the brightness non-uniformity of the liquid crystal display apparatus can be suppressed without increasing the thickness of the light guide plate 10. Therefore, a reduction in the thickness of the light guide plate 10 can be promoted and the brightness non-uniformity of the light guide plate 10 and the brightness non-uniformity of the liquid crystal display apparatus can be suppressed.

The light source 11 may be embedded in a transparent resin layer. FIGS. 10A to 10G are sectional views of the light guide plate 10. In a structure example shown in FIG. 10A, a transparent resin layer 51 is arranged between the light guide plate 10 and the plurality of light sources 11 and the reflective layer 14. Therefore, the plurality of light sources 11 are embedded in the transparent resin layer 51. The light guide plate 10 is arranged on top of the transparent resin layer 51 and the light sources 11 are not housed inside the depressed portions 20 of the light guide plate 10. The opposite surface 32 of the light guide plate 10 and the transparent resin layer 51 are in contact with each other but the opposite surface 32 of the light guide plate 10 and the reflective layer 14 are not in contact with each other. An upper surface of the transparent resin layer 51 is a flat surface. The upper surface of the transparent resin layer 51 is a contact surface with the light guide plate 10. Light emitted from the light sources 11 passes through the transparent resin layer 51 and is made incident into the light guide plate 10.

Figure 10A:
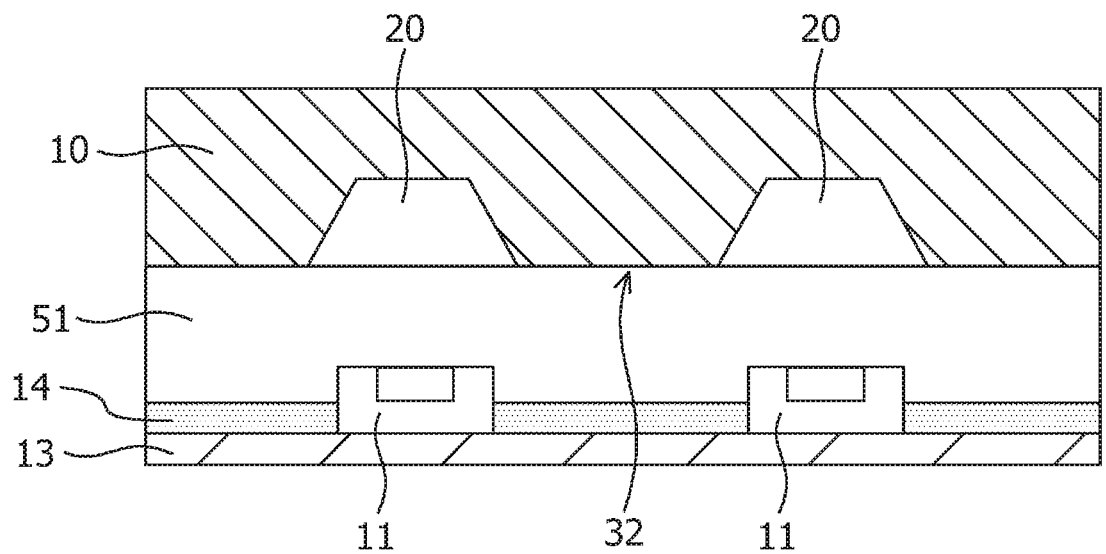
FIG. 10A is a sectional view of a light guide plate 10.
Figure 10B:
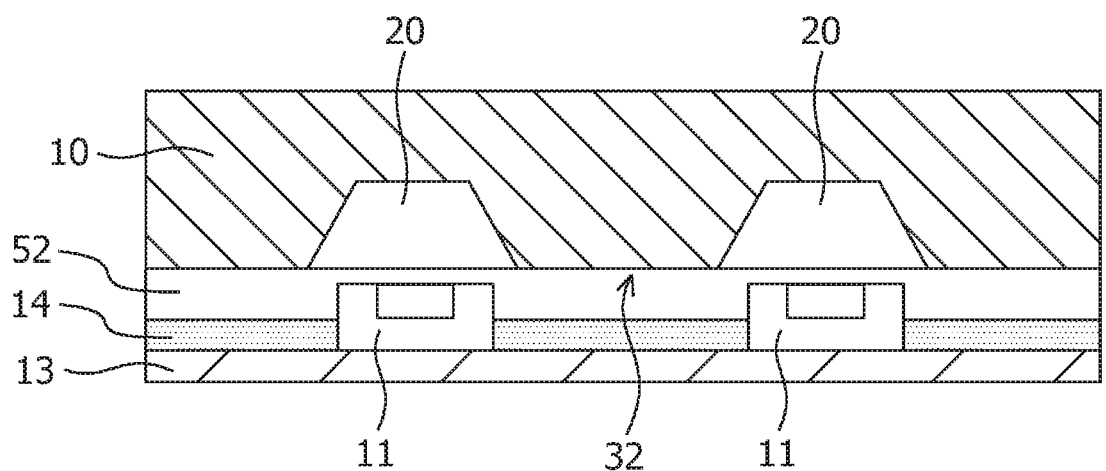
FIG. 10B is a sectional view of the light guide plate 10.

In a structure example shown in FIG. 10B, a transparent resin layer 52 is arranged between the light guide plate 10 and the plurality of light sources 11 and the reflective layer 14. Therefore, the plurality of light sources 11 are embedded in the transparent resin layer 52. The light guide plate 10 is arranged on top of the transparent resin layer 52 and the light sources 11 are not housed inside the depressed portions 20 of the light guide plate 10. The opposite surface 32 of the light guide plate 10 and the transparent resin layer 52 are in contact with each other but the opposite surface 32 of the light guide plate 10 and the reflective layer 14 are not in contact with each other. An upper surface of the transparent resin layer 52 is a flat surface. The upper surface of the transparent resin layer 52 is a contact surface with the light guide plate 10. Light emitted from the light sources 11 passes through the transparent resin layer 52 and is made incident into the light guide plate 10. In the structure example shown in FIG. 10B, a thickness of the transparent resin layer 52 is reduced from a thickness of the transparent resin layer 51 shown in FIG. 10A. Therefore, the transparent resin layer 52 directly above the light sources 11 is thinner.

Figure 10C:
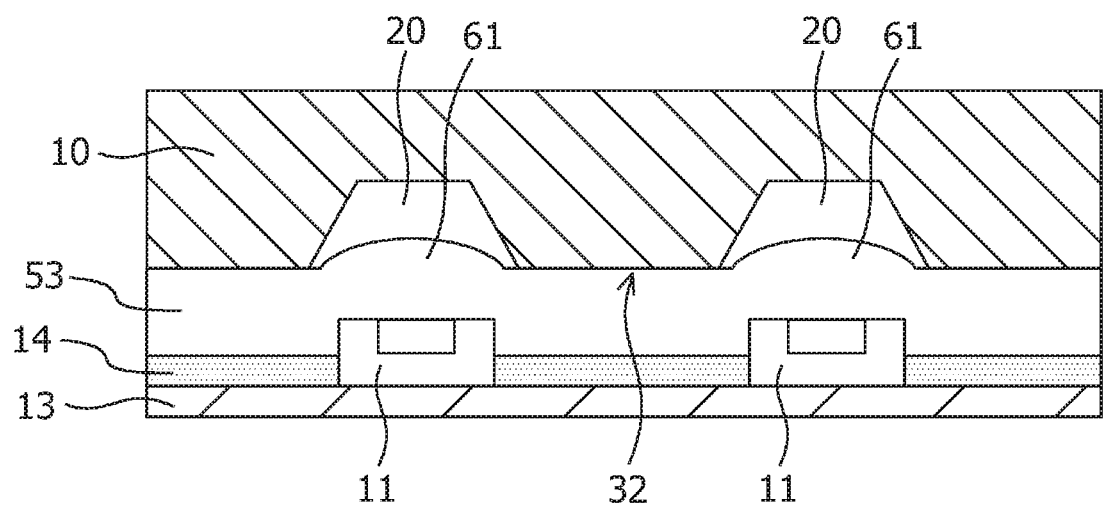
FIG. 10C is a sectional view of the light guide plate 10.

In a structure example shown in FIG. 10C, a transparent resin layer 53 is arranged between the light guide plate 10 and the plurality of light sources 11 and the reflective layer 14. Therefore, the plurality of light sources 11 are embedded in the transparent resin layer 53. The light guide plate 10 is arranged on top of the transparent resin layer 53 and the light sources 11 are not housed inside the depressed portions 20 of the light guide plate 10. The opposite surface 32 of the light guide plate 10 and the transparent resin layer 53 are in contact with each other but the opposite surface 32 of the light guide plate 10 and the reflective layer 14 are not in contact with each other. A plurality of protruded portions 61 are formed on an upper surface of the transparent resin layer 53. The upper surface of the transparent resin layer 53 is a contact surface with the light guide plate 10. While the protruded portions 61 of the transparent resin layer 53 shown in FIG. 10C have an approximately hemispherical shape, the protruded portions 61 of the transparent resin layer 53 are not limited to this shape and may have a projection shape (convex shape) such as a columnar shape, a prismatic shape, a conical shape, or a pyramid shape. The protruded portions 61 of the transparent resin layer 53 are positioned above the light sources 11, and a part of or all of the protruded portions 61 of the transparent resin layer 53 are inside the depressed portions 20 of the light guide plate 10. The bottom surfaces 21 of the depressed portions 20 of the light guide plate 10 and the protruded portions 61 of the transparent resin layer 53 may be in contact with each other or the bottom surfaces 21 of the depressed portions 20 of the light guide plate 10 and the protruded portions 61 of the transparent resin layer 53 may not be in contact with each other. The tapered surfaces 23 of the depressed portions 20 of the light guide plate 10 and the protruded portions 61 of the transparent resin layer 53 may be in contact with each other or the tapered surfaces 23 of the depressed portions 20 of the light guide plate 10 and the protruded portions 61 of the transparent resin layer 53 may not be in contact with each other. Light emitted from the light sources 11 passes through the transparent resin layer 53 and is made incident into the light guide plate 10.

Figure 10D:
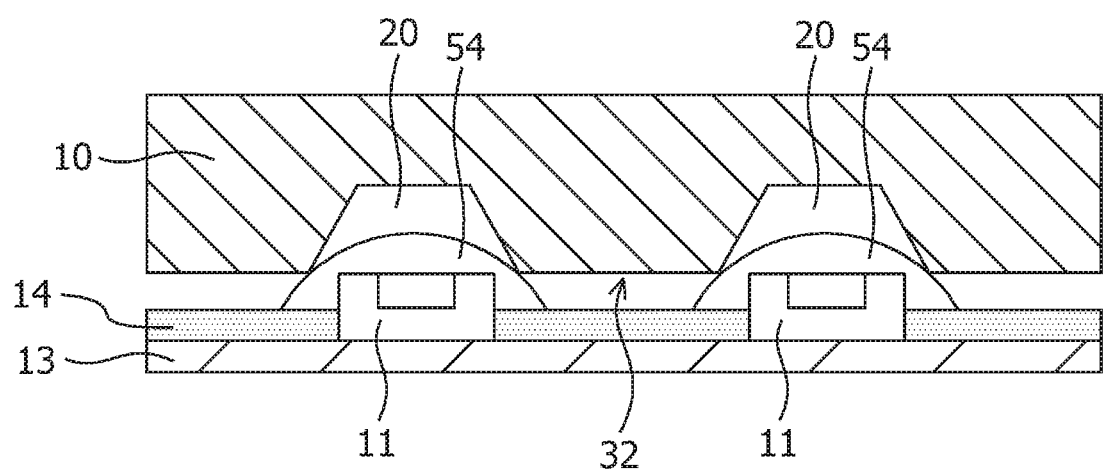
FIG. 10D is a sectional view of the light guide plate 10.

In a structure example shown in FIG. 10D, a plurality of transparent resin layers 54 are arranged below the light guide plate 10 and each transparent resin layer 54 is arranged between the light guide plate 10 and each of the plurality of light sources 11. Therefore, each light source 11 is embedded in each transparent resin layer 54. The light sources 11 are not housed inside the depressed portions 20 of the light guide plate 10. The light guide plate 10 and the transparent resin layers 54 are in contact with each other but the opposite surface 32 of the light guide plate 10 and the reflective layer 14 are not in contact with each other. The opposite surface 32 of the light guide plate 10 and the transparent resin layers 54 may be in contact with each other or the opposite surface 32 of the light guide plate 10 and the transparent resin layers 54 may not be in contact with each other. While the transparent resin layers 54 shown in FIG. 10D have an approximately hemispherical shape, the transparent resin layers 54 are not limited to this shape and may have a projection shape (convex shape) such as a columnar shape, a prismatic shape, a conical shape, or a pyramid shape. A part of the transparent resin layers 54 may be positioned inside the depressed portions 20 of the light guide plate 10 or a part of the transparent resin layers 54 may not be positioned inside the depressed portions 20 of the light guide plate 10. The bottom surfaces 21 of the depressed portions 20 of the light guide plate 10 and the transparent resin layers 54 may be in contact with each other or the bottom surfaces 21 of the depressed portions 20 of the light guide plate 10 and the transparent resin layers 54 may not be in contact with each other. The tapered surfaces 23 of the depressed portions 20 of the light guide plate 10 and the transparent resin layers 54 may be in contact with each other or the tapered surfaces 23 of the depressed portions 20 of the light guide plate 10 and the transparent resin layers 54 may not be in contact with each other. A boundary portion between the tapered surfaces 23 of the depressed portions 20 of the light guide plate 10 and the opposite surface 32 of the light guide plate 10 may be in contact with the transparent resin layers 54. Light emitted from the light sources 11 passes through the transparent resin layers 54 and is made incident into the light guide plate 10.

Figure 10E:
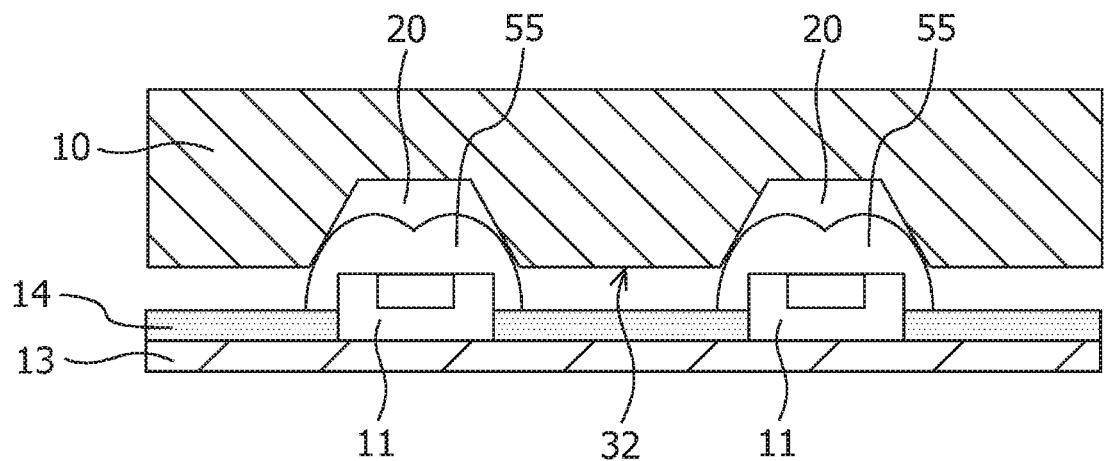
FIG. 10E is a sectional view of the light guide plate 10.

In a structure example shown in FIG. 10E, a plurality of transparent resin layers 55 are arranged below the light guide plate 10 and each transparent resin layer 55 is arranged between the light guide plate 10 and each of the plurality of light sources 11. Therefore, each light source 11 is embedded in each transparent resin layer 55. The light sources 11 are not housed inside the depressed portions 20 of the light guide plate 10. The light guide plate 10 and the transparent resin layers 55 are in contact with each other but the opposite surface 32 of the light guide plate 10 and the reflective layer 14 are not in contact with each other. The opposite surface 32 of the light guide plate 10 and the transparent resin layers 55 may be in contact with each other or the opposite surface 32 of the light guide plate 10 and the transparent resin layers 55 may not be in contact with each other. The transparent resin layers 55 have a shape in which two approximately hemispherical shapes are connected to each other. A part of the transparent resin layers 55 may be positioned inside the depressed portions 20 of the light guide plate 10 or a part of the transparent resin layers 55 may not be positioned inside the depressed portions 20 of the light guide plate 10. The bottom surfaces 21 of the depressed portions 20 of the light guide plate 10 and the transparent resin layers 55 may be in contact with each other or the bottom surfaces 21 of the depressed portions 20 of the light guide plate 10 and the transparent resin layers 55 may not be in contact with each other. The tapered surfaces 23 of the depressed portions 20 of the light guide plate 10 and the transparent resin layers 55 may be in contact with each other or the tapered surfaces 23 of the depressed portions 20 of the light guide plate 10 and the transparent resin layers 55 may not be in contact with each other. A boundary portion between the tapered surfaces 23 of the depressed portions 20 of the light guide plate 10 and the opposite surface 32 of the light guide plate 10 may be in contact with the transparent resin layers 55. Light emitted from the light sources 11 passes through the transparent resin layers 55 and is made incident into the light guide plate 10.

Figure 10F:
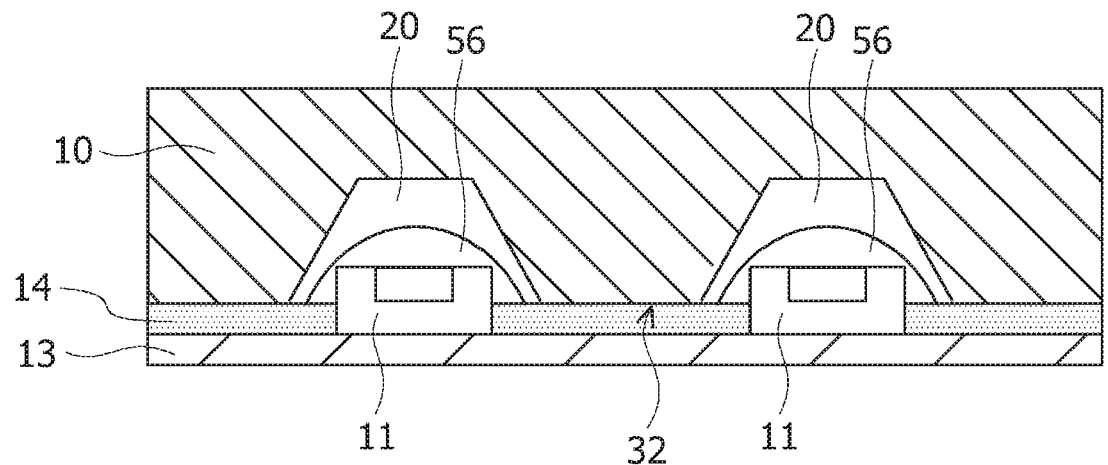
FIG. 10F is a sectional view of the light guide plate 10.

In a structure example shown in FIG. 10F, a plurality of transparent resin layers 56 are arranged below the light guide plate 10 and each transparent resin layer 56 is arranged between the light guide plate 10 and each of the plurality of light sources 11. Therefore, each light source 11 is embedded in each transparent resin layer 56. The light sources 11 and the transparent resin layers 56 are housed inside the depressed portions 20 of the light guide plate 10. The opposite surface 32 of the light guide plate 10 and the reflective layer 14 are in contact with each other. In other words, the light guide plate 10 and the reflective layer 14 are in close contact with each other. The bottom surfaces 21 of the depressed portions 20 of the light guide plate 10 and the transparent resin layers 56 may be in contact with each other or the bottom surfaces 21 of the depressed portions 20 of the light guide plate 10 and the transparent resin layers 56 may not be in contact with each other. The tapered surfaces 23 of the depressed portions 20 of the light guide plate 10 and the transparent resin layers 56 may be in contact with each other or the tapered surfaces 23 of the depressed portions 20 of the light guide plate 10 and the transparent resin layers 56 may not be in contact with each other. While the transparent resin layers 56 shown in FIG. 10F have an approximately hemispherical shape, the transparent resin layers 56 are not limited to this shape and may have a projection shape (convex shape) such as a columnar shape, a prismatic shape, a conical shape, or a pyramid shape. Light emitted from the light sources 11 passes through the transparent resin layers 56 and is made incident into the light guide plate 10.

Figure 10G:
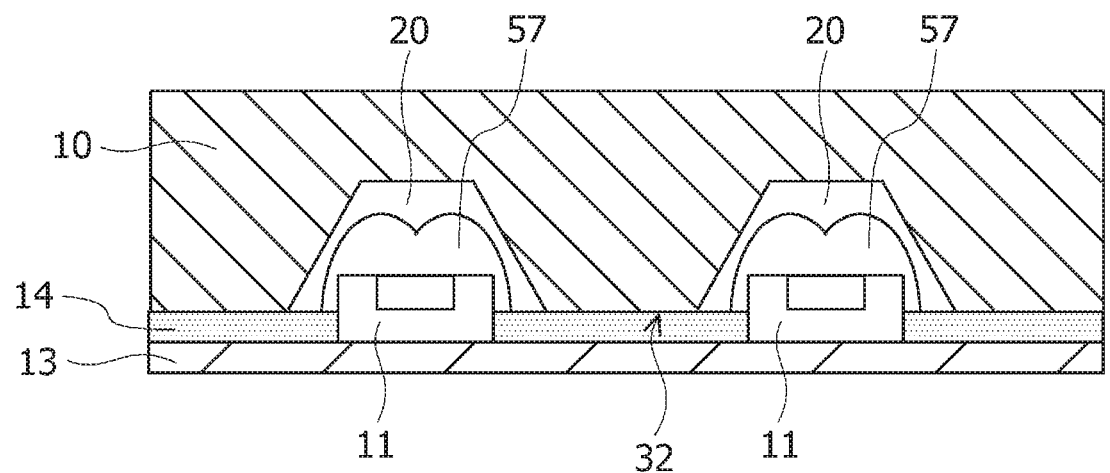
FIG. 10G is a sectional view of the light guide plate 10.

In a structure example shown in FIG. 10G, a plurality of transparent resin layers 57 are arranged below the light guide plate 10 and each transparent resin layer 57 is arranged between the light guide plate 10 and each of the plurality of light sources 11. Therefore, each light source 11 is embedded in each transparent resin layer 57. The light sources 11 and the transparent resin layers 57 are housed inside the depressed portions 20 of the light guide plate 10. The opposite surface 32 of the light guide plate 10 and the reflective layer 14 are in contact with each other. In other words, the light guide plate 10 and the reflective layer 14 are in close contact with each other. The bottom surfaces 21 of the depressed portions 20 of the light guide plate 10 and the transparent resin layers 57 may be in contact with each other or the bottom surfaces 21 of the depressed portions 20 of the light guide plate 10 and the transparent resin layers 57 may not be in contact with each other. The tapered surfaces 23 of the depressed portions 20 of the light guide plate 10 and the transparent resin layers 57 may be in contact with each other or the tapered surfaces 23 of the depressed portions 20 of the light guide plate 10 and the transparent resin layers 57 may not be in contact with each other. The transparent resin layers 57 have a shape in which two approximately hemispherical shapes are connected to each other. Light emitted from the light sources 11 passes through the transparent resin layers 57 and is made incident into the light guide plate 10.

In the structure examples shown in FIGS. 10A to 10E, the light sources 11 and the depressed portions 20 of the light guide plate 10 overlap with one another when viewed from a normal direction of the light exit surface 31 of the light guide plate 10 and the light sources 11 are arranged below the depressed portions 20 of the light guide plate 10. By arranging any of the transparent resin layers 51 to 55 between the light guide plate 10 and the light sources 11, a distance between the light guide plate 10 and the light sources 11 can be kept constant without increasing the thickness of the light guide plate 10. By separating the light guide plate 10 and the light sources 11 from each other without housing the light sources 11 inside the depressed portions 20 of the light guide plate 10, spread of light incident into the light guide plate 10 can be increased. Thicknesses of the transparent resin layers 51 to 55 are arbitrary. By changing the thicknesses of the transparent resin layers 51 to 55, the distance between the light guide plate 10 and the light sources 11 can be changed. For example, by changing the thicknesses of the transparent resin layers 51 to 55 in accordance with a type of the light sources 11, the distance between the light guide plate 10 and the light sources 11 can be changed in accordance with the type of the light sources 11.

In the structure examples shown in FIGS. 10F and 10G, the light sources 11 and the depressed portions 20 of the light guide plate 10 overlap with one another when viewed from a normal direction of the light exit surface 31 of the light guide plate 10 and the light sources 11 are arranged below the depressed portions 20 of the light guide plate 10. By housing the light sources 11 and the transparent resin layers 56 and 57 inside the depressed portions 20 of the light guide plate 10 and increasing the distance between the light guide plate 10 and the light sources 11, spread of light incident into the light guide plate 10 can be increased. Thicknesses of the transparent resin layers 56 and 57 are arbitrary. For example, the thicknesses of the transparent resin layers 56 and 57 may be changed in accordance with the type of the light sources 11.

The liquid crystal display apparatus described in the embodiment can be mounted to various electronic devices. Examples of electronic devices provided with such a liquid crystal display apparatus include a smartphone, a digital camera, a tablet terminal, an electronic book, a wearable device, a car navigation apparatus, an electronic dictionary, and an electronic billboard. Using the light guide plate 10, the planar light source apparatus 1, and the liquid crystal display apparatus according to the embodiment enables sizes and thicknesses of electronic devices to be reduced and, at the same time, enables the brightness non-uniformity of the liquid crystal display apparatus to be suppressed.

REFERENCE SIGNS LIST

1 Planar light source apparatus
2 Display panel
10 Light guide plate
11 Light source
12 Frame
13 Mounting substrate
14 Reflective layer
15 Diffusing sheet
16 Prism sheet
17 Light shielding member
20 Depressed portion
21 Bottom surface
22 Opening
23 Tapered surface
31 Light exit surface
32 Opposite surface
41 to 43 Dot pattern
51 to 57 Transparent resin layer

The invention claimed is:
1. A planar light source apparatus, comprising:
a light guide plate, the light guide plate comprising
a light exit surface from which light is emitted,
an opposite surface on an opposite side of the light exit surface,
a depressed portion provided on the opposite surface, and
a plurality of scattering portions provided on the light exit surface, the opposite surface, and a bottom surface of the depressed portion and which refract and scatter light;
a light source arranged on a side of the opposite surface of the light guide plate; and
a transparent resin layer arranged between the light guide plate and the light source, wherein
the depressed portion comprises a tapered surface which spreads from the bottom surface of the depressed portion toward an opening of the depressed portion,
the light source is embedded in the transparent resin layer, and housed outside of the depressed portion, such that the light source and the depressed portion overlap with one another when viewed from a normal direction of the light exit surface.

2. The planar light source apparatus according to claim 1, wherein the plurality of scattering portions provided on the light exit surface, the opposite surface, and the bottom surface of the depressed portion are respectively densely arranged.

3. The planar light source apparatus according to claim 1, wherein the depressed portion has a truncated cone shape.

4. The planar light source apparatus according to claim 1, wherein an angle of the tapered surface is set in accordance with an angle of a major axis of the light source.

5. The planar light source apparatus according to claim 1, wherein the transparent resin layer is positioned outside the depressed portion.

6. The planar light source apparatus according to claim 1, wherein a part of the transparent resin layer is positioned inside the depressed portion.

7. A display apparatus, comprising:
the planar light source apparatus according to claim 1; and
a display panel which receives light emitted from the planar light source apparatus.

8. An electronic device, comprising the display apparatus according to claim 7.

9. A planar light source apparatus, comprising:
a light guide plate, the light guide plate comprising;
  a light exit surface from which light is emitted,
  an opposite surface on an opposite side of the light exit surface,
  a plurality of depressed portions provided on the opposite surface, and
  a plurality of scattering portions which are provided on the light exit surface, the opposite surface, and a bottom surface of each of the plurality of the depressed portions and which refract and scatter light;
a plurality of light sources arranged on a side of the opposite surface of the light guide plate; and
at least one transparent resin layer arranged between the light guide plate and the plurality of light sources, wherein
the each of plurality of depressed portions comprises a tapered surface which spreads from the bottom surface toward an opening of the each of the plurality of the depressed portions,
the plurality of light sources are embedded in the at least one transparent resin layer, and housed outside of the plurality of depressed portions, such that each of the plurality of the light sources and the each of the plurality of the depressed portions overlap with one another when viewed from a normal direction of the light exit surface.

10. The planar light source apparatus according to claim 9, wherein an angle of the tapered surface is set in accordance with an angle of a major axis of the each of the plurality of the light sources.

11. The planar light source apparatus according to claim 9, wherein the plurality of scattering portions provided on the light exit surface, the opposite surface and the bottom surface are respectively densely arranged.

12. The planar light source apparatus according to claim 9, wherein the plurality of the depressed portions have a truncated cone shape.

13. The planar light source apparatus according to claim 9, wherein a part of the at least transparent resin layer is positioned inside the plurality of the depressed portions.

14. A display apparatus, comprising:
the planar light source apparatus according to claim 9; and
a display panel which receives light emitted from the planar light source apparatus.

15. An electronic device, comprising the display apparatus according to claim 14.

* * * * *